United States Patent [19]
Borg et al.

[11] Patent Number: 5,812,140
[45] Date of Patent: Sep. 22, 1998

[54] EFFICIENT GRAY TILE STORAGE

[75] Inventors: Lars Borg, Saratoga; James G. Sandman, Jr., Los Altos Hills; Geoffrey C. Sherwood, Milpitas, all of Calif.

[73] Assignee: Adobe Systems Incorporated, San Jose, Calif.

[21] Appl. No.: 709,041

[22] Filed: Sep. 5, 1996

[51] Int. Cl.⁶ .................................................. G06F 15/00
[52] U.S. Cl. .............................................................. 345/428
[58] Field of Search .................................. 345/435, 428, 345/429, 431, 432, 147, 150

[56] References Cited

U.S. PATENT DOCUMENTS

| | | | |
|---|---|---|---|
| 4,958,272 | 9/1990 | Wake | 364/518 |
| 5,651,104 | 7/1997 | Cosman | 395/128 |
| 5,666,475 | 9/1997 | Salesin et al. | 345/428 |

*Primary Examiner*—Phu K. Nguyen
*Attorney, Agent, or Firm*—Fish & Richardson P.C.

[57] ABSTRACT

A method building a tile of pixels usable by a marking routine in a raster output device to mark an output device pixel according to a sample value. The method includes the steps of receiving the sample value in a rendering process; deriving, from the sample value, a base value and a fractional tile of pixels; and building the pixels of the tile by adding the base value to the corresponding pixels of the fractional tile. The fractional tile may have a bit depth of one. The invention also features building a chunky color tile by deriving, from a sample color, one component base value for each color component; obtaining a component fractional tile for each color component of the sample color; and building each pixel in the chunky color tile as the composition of the sum of the component base values and the component fractional tile pixel values for the corresponding color components and pixel position. The component fractional tiles can be stored in a packed representation. The chunky color tile can have four color components. The invention also builds a pixel in chunky color tile by deriving, from a sample color, a base pixel in a device color space; obtaining a fractional tile for each component of the sample color; forming an addend from all the fractional tiles; and building the chunky color tile pixel by adding the addend to the base pixel.

27 Claims, 7 Drawing Sheets

FIG. 1

FIG. 2a
(BACKGROUND)

FIG. 2b
(BACKGROUND)

220

| 239 | 79 | 143 | 207 |
|-----|-----|-----|-----|
| 191 | 15 | 31 | 111 |
| 127 | 47 | 63 | 175 |
| 223 | 159 | 95 | 255 |

FIG. 2c
(BACKGROUND)

230

| 1100 | 1100 | 1100 | 1100 |
|------|------|------|------|
| 1100 | 1011 | 1011 | 1100 |
| 1100 | 1011 | 1100 | 1100 |
| 1100 | 1100 | 1100 | 1100 |

FIG. 2d
(BACKGROUND)

240

| 1100 | 0 | 0 | 0 | 1100 | 0 | 0 | 0 | 1100 | 0 | 0 | 0 | 1100 | 0 | 0 | 0 |
|------|---|---|---|------|---|---|---|------|---|---|---|------|---|---|---|
| 1100 | 0 | 0 | 0 | 1011 | 0 | 0 | 0 | 1011 | 0 | 0 | 0 | 1100 | 0 | 0 | 0 |
| 1100 | 0 | 0 | 0 | 1011 | 0 | 0 | 0 | 1100 | 0 | 0 | 0 | 1100 | 0 | 0 | 0 |
| 1100 | 0 | 0 | 0 | 1100 | 0 | 0 | 0 | 1100 | 0 | 0 | 0 | 1100 | 0 | 0 | 0 |

| C | | | | M | | | | Y | | | | K | | | | C | | | | M | | | | Y | | | | K | | | |
|---|---|---|---|---|---|---|---|---|---|---|---|---|---|---|---|---|---|---|---|---|---|---|---|---|---|---|---|---|---|---|---|
| 2 | 1 |   |   | 2 | 1 |   |   | 2 | 1 | 1 |   | 2 | 1 | 1 |   | 2 | 2 | 1 |   | 2 | 2 | 1 |   | 3 | 2 | 1 |   | 3 | 2 | 1 |   |
| 4 | 6 | 8 | 0 | 5 | 7 | 9 | 1 | 6 | 8 | 0 | 2 | 7 | 9 | 1 | 3 | 8 | 0 | 2 | 4 | 9 | 1 | 3 | 5 | 0 | 2 | 4 | 6 | 1 | 3 | 5 | 7 |

EFFICIENT GRAY TILE STORAGE

BACKGROUND

The invention relates to the production of halftone images on digital output devices, and more particularly to the definition, creation, storage, and use of gray tiles rendered from halftoning threshold arrays.

A continuous tone image does not print well on most printing devices, so the image is usually printed as pattern of dots based on a grid. The grid generally consists of an array of halftone cells, each of which represents one section of continuous tone in the original image. When reproducing a halftoned image using a digital recording device, a halftone cell consists of a number of device pixels. In a device that produces only black and white pixels, some of the display pixels of each halftone cell are turned black to form dots that are relatively larger or smaller to represent darker or lighter portions of the original continuous tone image. In a dark halftone cell, most of the pixels are black, while in a light half-tone cell, most of the pixels are white. A complete grid of the original image is composed of many such halftone cells, each of which has an independent density of displayed pixels and therefore a different apparent darkness when viewed from a distance.

A conventional method of selecting which dots to turn black works as follows. For a given halftone cell, the original image is sampled at each display pixel location in the halftone cell to obtain a sample value. This sample value is represented digitally as a number in a fixed range, typically zero to 255. The sample value is then compared to a threshold value at the display pixel location and the display pixel is turned white if the sample value is greater than the threshold value, and black otherwise. The threshold values, in turn, are supplied by a threshold array, which provides a threshold value for each pixel in the halftone cell. This process is carried out for each halftone cell of the image.

The term threshold array is commonly used to denote a set of generic pixels, each of which has a "threshold value". The device plane is tiled with copies of the threshold array, so that each device pixel is mapped to one generic pixel and its threshold value. After the desired sample value for the device pixel is computed—from the image being halftoned, for example—it is compared to the threshold value. If the sample level is greater than the threshold value, the device pixel is left white; otherwise, it is marked black.

A threshold array is much like a sampled image: it is generally a rectangular array of pixel values defined entirely in device space. It can be built algorithmically, by use of a spot function, for example, or it can be built by hand. The sample values occupy some number of bits: In a typical system, the sample values occupy 8 bits that represent gray levels ranging from zero for black and 255 for white.

The scheme generalizes to monochrome devices with multiple bits per pixel. For example, with 2 bits per device pixel, each device pixel can directly represent one of four different gray sample levels. For each device pixel that is to be painted with some in-between gray level, the corresponding pixel of the threshold array is consulted to determine whether to use next-lower or next-higher directly-representable gray level. In this situation, the samples of the threshold array do not represent absolute gray values, but rather gradations between two adjacent representable gray levels.

Halftoning is also used to approximate continuous-tone colors by a pattern of pixels that can achieve only a limited number of discrete colors. The input to the halftone function includes continuous-tone color components in the device's native color space. The output includes pixels representing colors the device can reproduce. Some devices can reproduce continuous-tone colors directly. These are known as "contone" devices. For such devices, halftoning is not required and color components can be transmitted directly to the marking engine of the device.

A halftone defined in this way can also be used with color output devices whose pixels consist of component colors that are either completely on or completely off. Most color printers, but not color displays, work this way. Halftoning is applied to each color component independently, producing shades of that color. The red, green, and blue values, for example, are created independently as gray levels, and a threshold array is applied to each color.

Further information on halftoning may be found in U.S. Pat. Nos. 5,285,291 and 5,305,118, as well as in such standard reference works as Foley, van Dam et al., Computer Graphics, Addison-Wesley (2d ed. 1992), pp. 568–573; and Adobe Systems Incorporated, Adobe PostScript® Language Reference Manual, Addison-Wesley (2d ed. ©1990), pp. 309–319.

Gray tiles and color tiles, like threshold arrays, are constructs used to tile the device plane; but rather than having threshold values for their generic pixels, the pixels of a gray tile (or a color tile) have the directly-representable gray (or color) values derived from one sample gray (or color) value and the threshold array. For this reason, gray and color tiles are used to render fills, strokes, and masks on raster devices that are not contone. A gray tile is built from a threshold array and a gray sample value. The threshold array is used to choose between two adjacent pixel values: one that is darker, and one that is lighter, than the gray sample value. A planar color device is one that creates a plate for each color component—for example, the C, M, Y, and K components for a CMYK device—and so can treat each plate as a single-component gray device and use gray tiles. A chunky color device is one in which each pixel is stored with all its color component values. A chunky color device generally builds gray tiles for each color first and then composites them to produce a color tile.

For example, a 16-bit color raster device may provide 4 bits for each color component (C, M, Y, and K) in each 16-bit pixel. A chunky color tile for one color for such a device will have a value for each of the four color components. The component color tiles that are composited to form a chunky color tile may also have a 16 bit wide field for each pixel, with non-zero values for only one color component. Such component color tiles can be composited simply by adding them together to form a chunky color tile.

SUMMARY

In general, in one aspect, the invention features a method building a tile of pixels usable by a marking routine in a raster output device to mark an output device pixel according to a sample value. The method includes the steps of receiving the sample value in a rendering process; deriving, from the sample value, a base value and a fractional tile of pixels; building the pixels of the tile by adding the base value to the corresponding pixels of the fractional tile. Preferred embodiments of the invention include one or more of the following features. The fractional tile has a bit depth of one and the method further includes the step of storing the fractional tile in a cache for later use by the rendering process. The step of deriving a fractional tile includes applying the sample value to a threshold array.

In general, in another aspect, the invention features a method building a chunky color tile usable in halftoning a sample color having color components for a chunky color raster output device. The method includes the steps of deriving, from the sample color, one component base value for each color component; obtaining one component fractional tile corresponding to each color component of the sample color; and building each pixel in the chunky color tile as the composition of the sum of the component base values and the component fractional tile pixel values for the corresponding color components and pixel position. Preferred embodiments of the invention include one or more of the following features. The component fractional tiles are stored in a cache in a packed representation. The chunky color tile has four color components. The color components of the chunky color tile have a bit depth of four. The sample color has a range of at least 256 possible values per component.

In general, in another aspect, the invention features a method building a pixel for a pixel position in chunky color tile for halftoning a sample color in a sample color space to a device color space, where both spaces have the same color components. The method includes the steps of deriving, from the sample color, a base pixel in the device color space; obtaining one fractional tile for each component of the sample color; forming an addend with the pixels at the pixel position from all the fractional tiles; and building the chunky color tile pixel by adding the addend to the base pixel. Preferred embodiments of the invention include one or more of the following features. The color components are cyan, magenta, yellow, and key. Each fractional tile has a bit depth of one; and the addend is formed by incorporating into one quantity the pixels of all the fractional tiles for a plurality of pixel positions and masking the quantity to leave the fractional tile pixels in position to be added to the base pixel. The addend is formed to have fractional tile pixels for an additional second pixel position; and the step of building the chunky color tile pixel builds two chunky color tile pixels with a single addition operation. A successive addend is formed from the quantity by a shifting and a masking operation. The quantity incorporates all the pixels of all the fractional tiles for a total of two, four, eight, or sixteen pixel positions.

In general, in another aspect, the invention features a method storing gray tile information for a gray tile for use in marking a region for output on a raster output device. The method includes the steps of decomposing the gray tile information into a base pixel value and a fractional tile having a bit depth less than that of the gray tile; and storing the fractional tile for use in building gray tiles for marking the region. Preferred embodiments of the invention include one or more of the following features. The bit depth of the fractional tile is one and each fractional tile pixel bit represents a selection between the base pixel value and an adjacent output device pixel value. The fractional tile is stored in a packed representation.

In general, in another aspect, the invention features a computer program product, tangibly stored on a computer-readable medium, that defines a full set of gray tiles for halftoning on a raster output device that can directly represent NGray output values. The gray tiles include a set of NGray base pixel values and a set of fractional tiles; and each gray tile in the full set consists essentially of one of the NGray base pixel values and one of the set of fractional tiles. Preferred embodiments of the invention include one or more of the following features. The fractional tiles have a bit depth of one. The possible number of different sample values to be halftoned using one of the full set of gray tiles is 256, and NGray is 16. The possible number of different sample values to be halftoned is evenly divisible by NGray-1 and the quotient of the division is the number of different fractional tiles in the set of fractional tiles. The computer-readable medium is a non-volatile memory connected to a raster output device. The raster output device is selected from the group consisting of a laser printer, a color laser printer, an inkjet printer, and a color inkjet printer.

In general, in another aspect, the invention features a raster output device that has means for marking an output device pixel with an output value defined by a tile, and means for building the tile from a base value and a fractional tile. Preferred embodiments of the invention include one or more of the following features. The device has means for rendering a fractional tile for a sample value in response to a request from the marking means, where the fractional tile has a bit depth of one; and a cache for storing fractional tiles for use by the means for building a tile. The foregoing means may include computer instructions stored in permanent or volatile memory on the device and a general or special purpose processor controlled by the instructions to perform the required functions; or the means may include dedicated hardware implemented as an ASIC or other form of circuitry; or the means may include other structures described in this specification. The raster output device also has memory storing a full set of fractional tiles for a range of possible pixel sample values for the output device pixel.

In general, in another aspect, the invention features a computer program, residing on a computer-readable medium, having instructions for causing a raster output device to build a tile based on a fractional tile and a base value and to provide the tile to a marking routine in response to a request for a tile to halftone a sample value.

Among the advantages of the invention are one or more of the following. Because they are smaller, a full set of fractional tiles can be cached more easily than a full set of gray or chunky color tiles. When fractional tiles apply to more than one base value, the likelihood of cache hits increases.

Other features and advantages of the invention will become apparent from the following description and from the claims.

DETAILED DESCRIPTION

Figure 1:
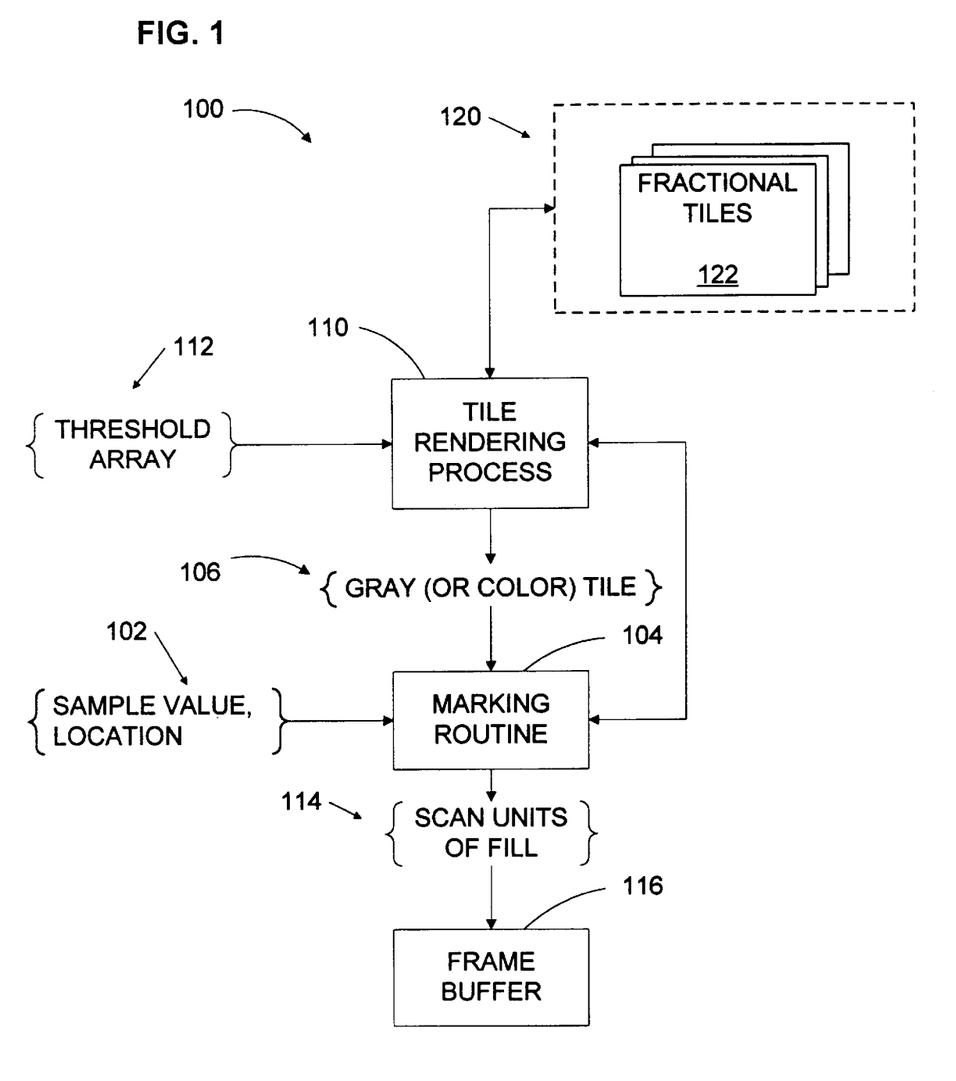
FIG. 1 is a flow diagram of a method using fractional tiles in halftone rendering in accordance with the present invention.

Referring to FIG. 1, a conventional rendering and marking process for non-contone raster output devices is enhanced by the addition of a method using fractional tiles to produce gray tiles and color tiles (100). In a printer, for example, a marking routine 104 is called to print a sample gray or color level at a location (102). The marking routine requests a gray or color tile from a tile rendering process 110. Conventionally, the rendering process will produce the requested tile 106 either by retrieving it from a cache of tiles or, if the tile for the sample value is not in the cache, by building the tile from a threshold array 112. Using fractional tiles, the rendering process 110 builds the requested tile from fractional tiles, as will be described. Fractional tiles can be built by the tile rendering process 110 using the same basic functions the process previously used to build full tiles. Like full tiles, fractional tiles 122 are advantageously stored in a cache 120, because they are expensive to build. When it has the tile 106 it requested, the marking routine 104 copies the pixels from the tile into appropriate part of a frame buffer 116. It is conventional to organize a frame buffer into scan lines divided into scan units and for a marking routine to write full scan units 114 when possible. The embodiment described in this specification uses a scan unit of 32 bits.

Figure 2A:
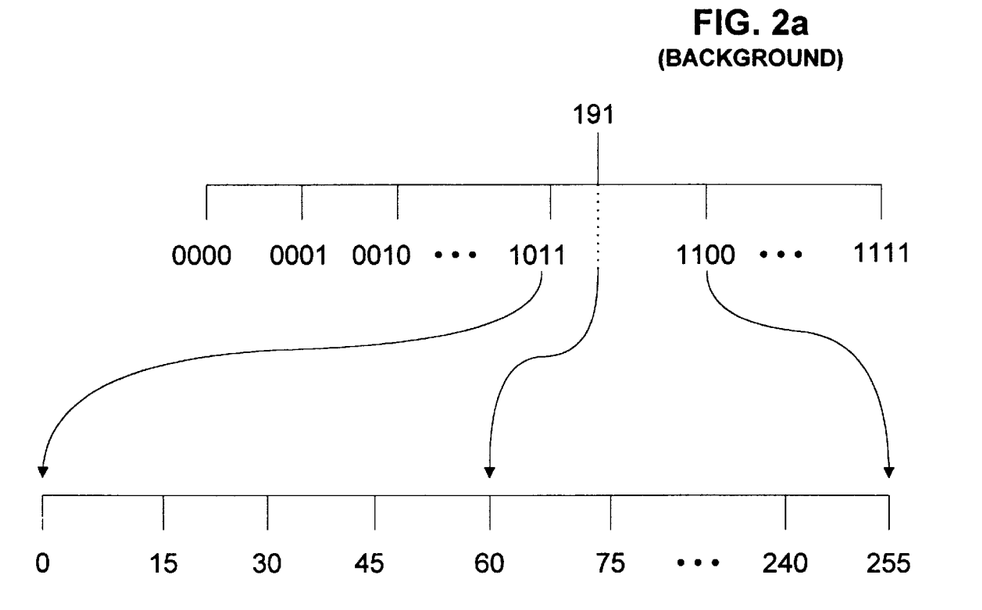
FIG. 2a (background) illustrates the translation of a sample value to a thresholding value.

Referring to FIG. 2a, the lesser (or base) pixel value and the thresholding value for a sample value (either a gray or a component of a color) can be computed using the following formulas (in the style of the language C):

lesser pixel value=(sample*(NGray-1))/GrayMax    (1)

thresholding value=(sample*(NGray-1))%GrayMax    (2)

Figure 2B:
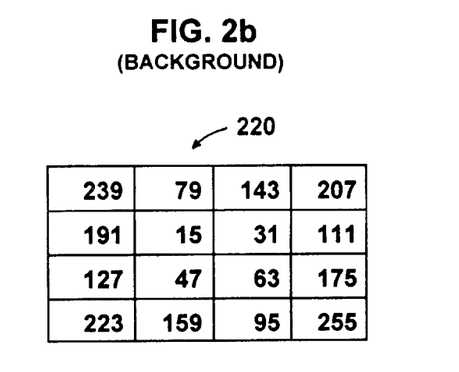
FIG. 2b (background) illustrates a threshold array.
Figure 2C:
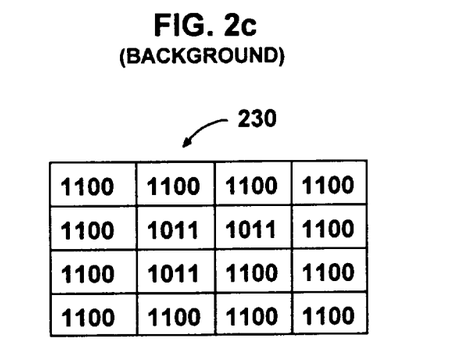
FIG. 2c (background) illustrates a gray tile.

In these formulas, NGray is the number of different values or levels the device can produce for the gray or component color, and GrayMax is the largest possible sample value (the smallest is zero). This is illustrated in FIG. 2a for a sample value=191, NGray=16, and GrayMax=255. The gray value 191 falls between the pixel values 1011 and 1100 (binary). The base pixel value is therefore 1011 (binary) and the thresholding value is 60 (decimal). On a monochrome 4-bit device, 16 of 256 possible sample gray values can be represented directly by the device as "creamy colors", and the remaining 240 sample values must be halftoned. FIGS. 2b and 2c show the threshold array 220 and gray tile 230 for the gray value 191 of this example.

Figure 2D:
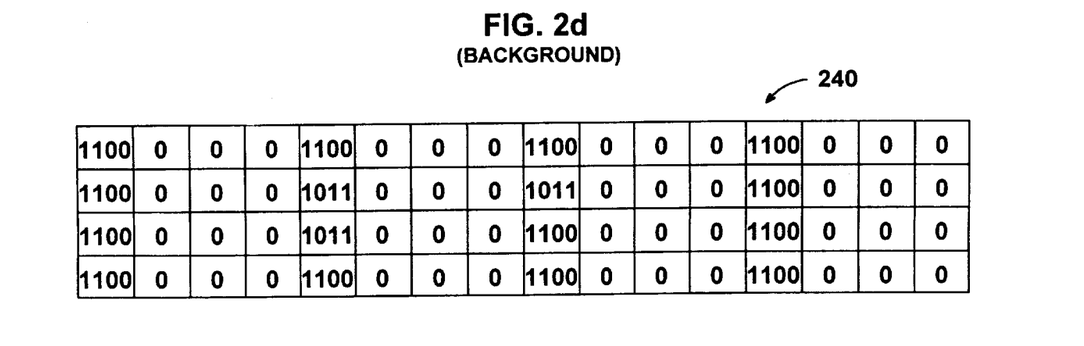
FIG. 2d (background) illustrates a component color tile for a chunky color device.

Referring to FIG. 2d, a 4×4 component color tile 240 (a gray tile for a particular color component) has a non-zero value in the position of only one of the color components. The illustrated tile 240 is for the cyan component of a chunky CMYK device. To make a composite color tile, four gray tiles (one for each of the color components) are merged to produce the color tile. Merging is done simply by adding the pixel values from each of the corresponding gray tiles.

Figure 3:
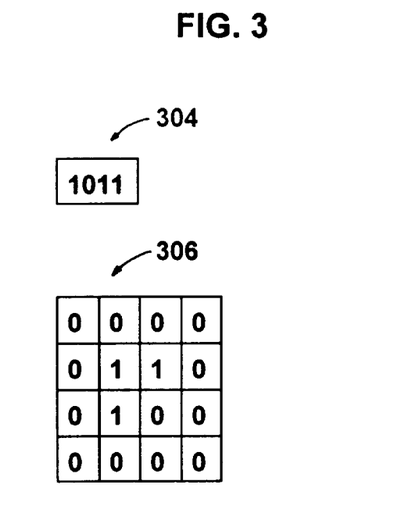
FIG. 3 illustrates the gray tile of FIG. 2c and its decomposition into a base pixel value and a fractional tile.

Referring to FIG. 3, with fractional tiles, the information contained in a gray tile is decomposed into a base pixel value and a one-bit per pixel fractional tile. Each one-bit pixel of the fractional tile chooses between the base pixel value and the next pixel value. FIG. 3 shows the decomposition of gray tile 230 (FIG. 2c) into a base pixel value 304 and a one-bit fractional tile 306. There are exactly 17 of these one-bit fractional tiles for the above example because GrayMax is exactly 17 times (NGray-1).

It is advantageous to store a fractional tile in a packed representation. In the process of producing a gray tile, an eight-bit byte of the packed representation is expanded to provide one bit per pixel. For a chunky color tile, the one-bit pixel of each color-component fractional tile is added to the corresponding color component in the chunky color tile. Using the method described below, eight pixels can be produced in each iteration, so using fractional tiles to produce gray tiles, and especially to produce chunky color tiles, can be much faster than producing them from a threshold array.

Figure 5:
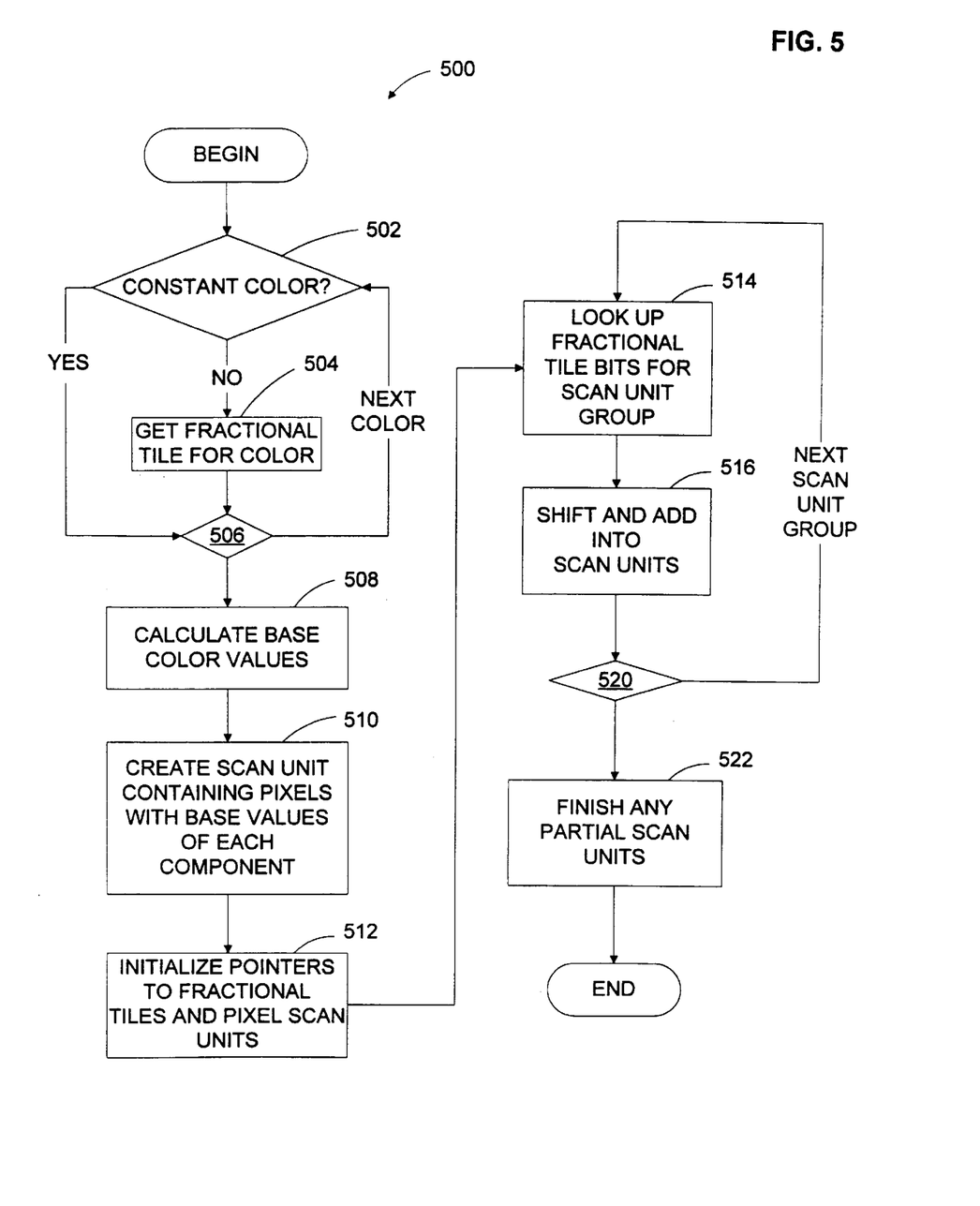
FIG. 5 and FIG. 6 together are a flow diagram of a method of constructing scan units from fractional tiles.

Referring to FIG. 5, a method 500 of building a chunky color tile by halftoning a sample color having four color components will be described. (In a simplified form, the method can be used to build a gray tile for a planar color or a multibit monochrome device.) For each color component (506), unless the component is a constant (creamy) color (502), the method gets a fractional tile (504 and FIG. 6).

Figure 6:
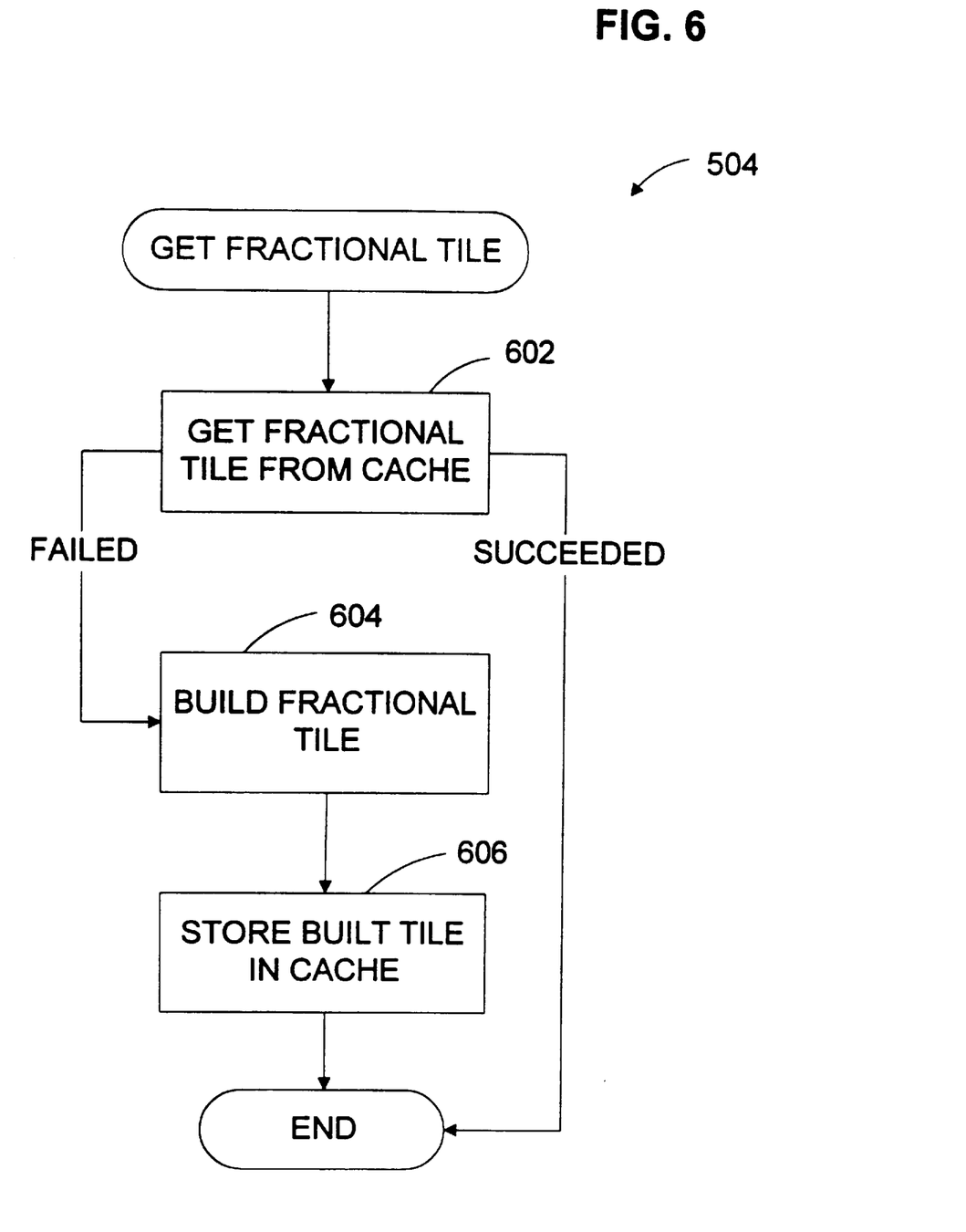

Referring to FIG. 6, the process 504 of getting a fractional tile begins by getting the requested tile from a cache of fractional tiles 120 (FIG. 1) if it is present there (602). If it is not present, the fractional tile is built (604) from the threshold array (which is specific to the color component if separate screens are used for each color component). The fractional tile is stored in a packed representation. With a length of 32 bits, a word is packed with 32 one-bit pixel elements. After it is built, the fractional tile is stored in the fractional tile cache 120 (FIG. 1) (606).

Returning to FIG. 5, the base color value for each color component is calculated (508) and a scan unit of device pixels is created that contains the base color value (the lesser value) of each component in each pixel (510). For a chunky color device with four bits for each of four color components, a 32-bit scan unit (word) will contain two pixels of 16 bits each.

Figure 4:
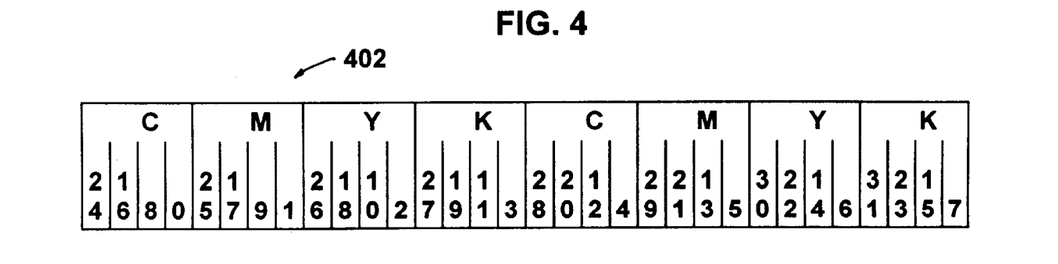
FIG. 4 illustrates a compressed representation of eight bits of four fractional tiles in a 32-bit word.

Next, pointers are initialized (512) for the process of unpacking the fractional tiles and adding their contents to the base values to create a chunky color tile (514–522). For a group of four 32-bit scan units (520) covering a total of eight 4-component pixels, four 8-bit bytes (one for from each fractional tile for component) are spread into one 32-bit word in a way that facilitates masking and adding them into the four scan units. One arrangement of bits (big-endian) for the 32-bit word is shown in table 402 of FIG. 4, which is the one used in the process that will now be described. This arrangement can be achieved by using each byte of a fractional tile as an index into a lookup table, which provides a 32-bit word with the fractional tile bits spread as required (514). With the arrangement 402, and a value of 0×11111111 (hexadecimal) as a mask, all the fractional tile bits for four scan units (eight chunky pixels) can be added to a scan unit containing base values (built in step 510) in four mask-and-add operations, each separated by a one-bit shift (516). In the first operation, for example, bits 0–7 (FIG. 4) are masked and added to eight 4-bit nibbles representing C, M, Y, and K components of two pixels in one scan unit. Then the word is shifted right one bit, bits 8–15 are masked and added, and so on. Note that the add operation cannot overflow across components because the largest component value appears in the base pixel only if it is a creamy color. Because a tile need not contain a whole number of scan units, a partial scan unit may have to be completed (522) before the chunky color tile is done.

With 256 possible input sample values and 16 device values, fractional tiles for different base values can be the same, and it is therefore possible to reuse fractional tiles with different base values (as long as the threshold array remains unchanged). This is not true in all cases. In general, the number of sample gray levels that has to be halftoned is the total number possible of sample gray levels minus the number output values the device can produce. If this difference is evenly divisible by the number of output values minus one, the quotient is the number of different fractional tiles that will be required.

Producing chunky color tiles from fractional tiles has two significant advantages over the method of merging component color tiles described earlier. First, using fractional tiles requires less memory access since much of the data is read from the smaller fractional tiles. More significantly, the gray tiles need not be produced, saving both the storage and the time required to construct them.

The following table shows the possible reductions in tile storage, data transfer, and halftoning that can be realized from the use of fractional tiles. The columns "Dithered grays" show the number of gray tiles that must be cached to achieve all non-creamy gray levels from cached tiles. The columns "Bits/pixel" is the number of bits per pixel used in the cached form of the gray tile. "Tile storage reduction" measures savings in memory usage when caching all gray tiles that are needed to print 256 sample gray levels. This is the memory needed for the conventional gray tiles described above divided by the memory needed for fractional tiles. In the best case shown, the fractional tile method uses 1/60th of the memory used by the conventional method. "Data transfer reduction" measures savings in memory access when building a chunky color tile. It is bytes read from memory and written to memory in the conventional method described above divided by the same quantity in the fractional tile method. In the best case shown, the fractional tile method requires 1/4th as much memory access as the conventional method. (There is no data transfer reduction for planar devices, but rather a loss, as in the conventional method the tiles are stored in their final format, while in the fractional tile method the tiles must be expanded before they can be used.) "Halftoning reduction" measures savings in tile-building time when building all gray tiles that are needed to print 256 sample gray levels. It is the number of comparisons between the sample value and the threshold array value in the innermost loop of the gray tile building code of the conventional method divided by the same for the fractional tile method. In the best case shown, the fractional tile method does 1/60th as many comparisons.

cessor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

Figure 7:
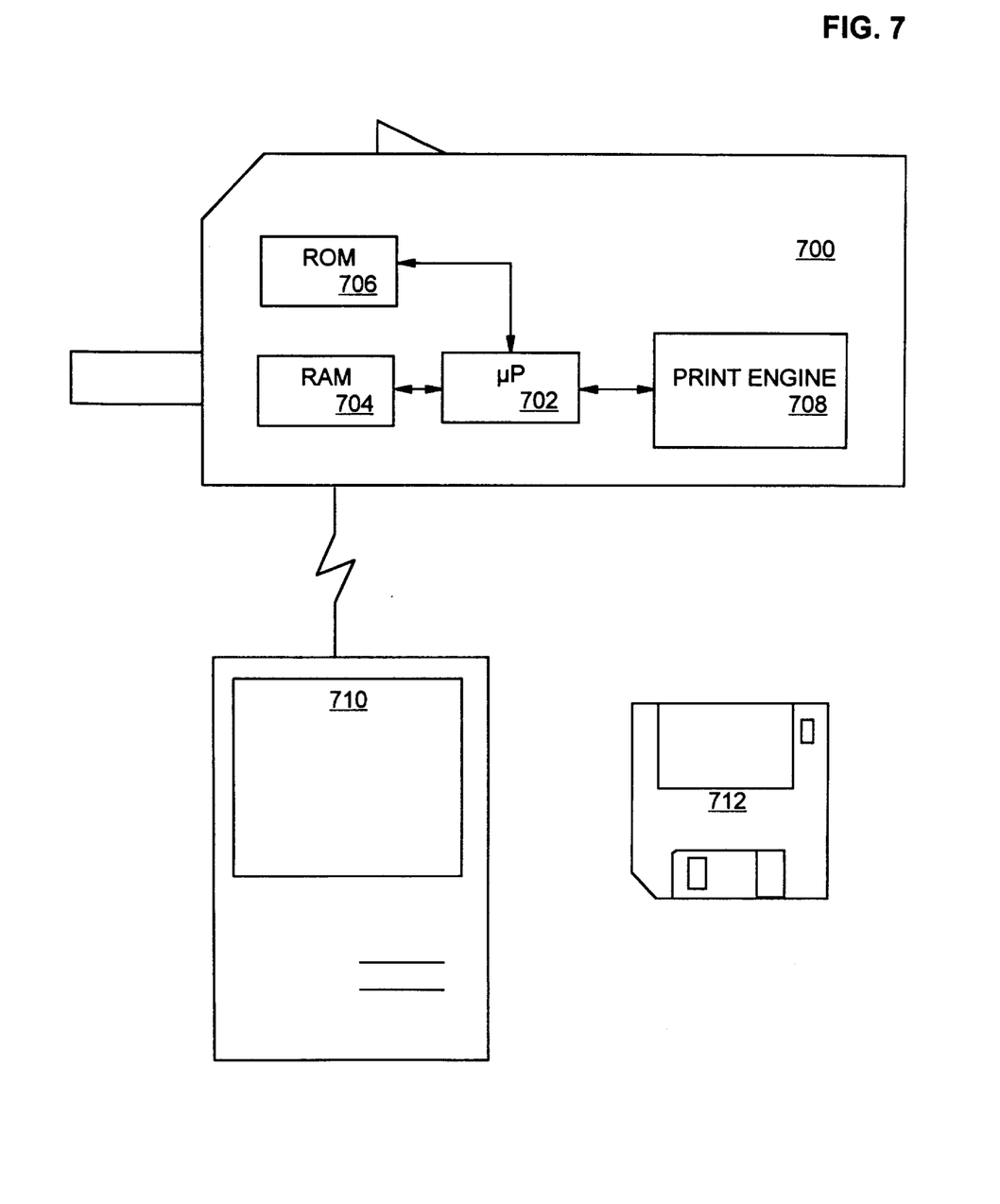
FIG. 7 is a diagram illustrating apparatus embodying the present invention.

By way of example, a printing device 700 implementing an interpreter for a page description language, such as the PostScript® language, includes a microprocessor 702 for executing program instructions (including font instructions) stored on a printer random access memory (RAM) 704 and a printer read-only memory (ROM) 706 and controlling a print marking engine 708. The essential elements of a computer are a processor for executing instructions and a memory. A computer can generally also receive programs and data from a storage medium such as a removable disk 712. These elements will be found in a conventional desktop or workstation computer 710 as well as other computers suitable for executing computer programs implementing the methods described here, which may be used in conjunction with any digital print engine or marking engine, display monitor, or other raster output device capable of producing color or gray scale pixels on paper, film, display screen, or other output medium.

Other embodiments are within the scope of the following claims. For example, the steps of the invention may be changed by those skilled in the art and still achieve desirable results. A fractional tile may have a bit depth greater than one. The threshold arrays need not be square, rectangular or of any other particular shape. Threshold arrays are generally

| Device Bits/plane | Conventional | | New | | Tile storage reduction | Data transfer reduction | Halftoning reduction |
|---|---|---|---|---|---|---|---|
| | Dithered grays | Bits/pixel | Dithered grays | Bits/pixel | | | |
| Planar | | | | | | | |
| 1 | 254 | 1 | 254 | 1 | 1 | n/a | 1 |
| 2 | 252 | 2 | 84 | 1 | 6 | n/a | 3 |
| 4 | 240 | 4 | 16 | 1 | 60 | n/a | 15 |
| Chunky with separate screens for C, M, Y, and K | | | | | | | |
| 1 | 1016 | 4 | 1016 | 1 | 4 | 2.50 | 1 |
| 2 | 1008 | 8 | 336 | 1 | 24 | 3.33 | 3 |
| 4 | 960 | 16 | 64 | 1 | 240 | 4.00 | 15 |
| Chunky with one common screen for C, M, Y, and K | | | | | | | |
| 1 | 1016 | 4 | 254 | 1 | 16 | 2.50 | 4 |
| 2 | 1008 | 8 | 84 | 1 | 96 | 3.33 | 12 |
| 4 | 960 | 16 | 16 | 1 | 960 | 1.00 | 60 |

Referring to FIG. 7, the invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors include, by way of example, both general and special purpose microprocessors. Generally, a promuch larger than the 4×4 arrays shown for illustrative purposes in the figures. Commercially useful sizes include 256×256 and 386×386. The number of sample levels can have a value other than 256, both larger or smaller: for example, the use of 4096 or even 65535 levels can be advantageous in rendering fine gradients. The number of levels in a color component can have a value other than 16, both larger or smaller: for example, values of 2, 4, 5, 8, 32, 64, 128, 256, and 4096 may each be advantageous for particular applications.

What is claimed is:

1. A method building a tile of pixels usable by a marking routine in a raster output device to mark an output device pixel according to a sample value, comprising:

receiving the sample value in a rendering process;

deriving, from the sample value, a base value and a fractional tile of pixels; and building the pixels of the tile by adding the base value to the corresponding pixels of the fractional tile.

2. The method of claim 1 where:

the fractional tile has a bit depth of one; and the method further comprises storing the fractional tile in a cache for later use by the rendering process.

3. The method of claim 1 where the step of deriving a fractional tile comprises applying the sample value to a threshold array.

4. A method of building a chunky color tile usable in halftoning a sample color having color components for a chunky color raster output device, comprising:

deriving, from the sample color, one component base value for each color component;

obtaining one component fractional tile corresponding to each color component of the sample color; and building each pixel in the chunky color tile as the composition of the sum of the component base values and the component fractional tile pixel values for the corresponding color components and pixel position.

5. The method of claim 4 where the component fractional tiles are stored in a cache in a packed representation.

6. The method of claim 4 where the chunky color tile has four color components.

7. The method of claim 4 where the color components of the chunky color tile have a bit depth of four.

8. The method of claim 4 where the sample color has a range of at least 256 possible values per component.

9. A method building a pixel for a pixel position in chunky color tile for halftoning a sample color in a sample color space to a device color space, both spaces having the same color components, comprising:

deriving, from the sample color, a base pixel in the device color space;

obtaining one fractional tile for each component of the sample color;

forming an addend with the pixels at the pixel position from all the fractional tiles; and building the chunky color tile pixel by adding the addend to the base pixel.

10. The method of claim 9 where the color components are cyan, magenta, yellow, and key.

11. The method of claim 9 where:

each fractional tile has a bit depth of one; and the addend is formed by incorporating into one quantity the pixels of all the fractional tiles for a plurality of pixel positions and masking the quantity to leave the fractional tile pixels in position to be added to the base pixel.

12. The method of claim 11 where:

the addend is formed to have fractional tile pixels for an additional second pixel position; and the step of building the chunky color tile pixel builds two chunky color tile pixels with a single addition operation.

13. The method of claim 11 further comprising the step of forming a successive addend from the quantity by a shifting and a masking operation.

14. The method of claim 11 where the quantity incorporates all the pixels of all the fractional tiles for a total of two, four, eight, or sixteen pixel positions.

15. A method storing gray tile information for a gray tile for use in marking a region for output on a raster output device, the method comprising the steps of:

decomposing the gray tile information into a base pixel value and a fractional tile having a bit depth less than that of the gray tile; and storing the fractional tile for use in building gray tiles for marking the region.

16. The method of claim 15 where the bit depth of the fractional tile is one and each fractional tile pixel bit represents a selection between the base pixel value and an adjacent output device pixel value.

17. The method of claim 15 where the fractional tile is stored in a packed representation.

18. A computer program product tangibly stored on a computer-readable medium, the stored program product defining a full set of gray tiles for halftoning on a raster output device that can directly represent NGray output values, the gray tiles comprising:

a set of NGray base pixel values; and a set of fractional tiles; where each gray tile in the full set consists essentially of one of the NGray base pixel values and one of the set of fractional tiles.

19. The computer program product of claim 18 where the fractional tiles have a bit depth of one.

20. The computer program product of claim 18 where the possible number of different sample values to be halftoned using one of the full set of gray tiles is 256 and NGray is 16.

21. The computer program product of claim 18 where the possible number of different sample values to be halftoned is evenly divisible by NGray-1 and the quotient of the division is the number of different fractional tiles in the set of fractional tiles.

22. The computer program product of claim 18 where the computer-readable medium is a non-volatile memory connected to a raster output device.

23. The computer program product of claim 22 where the raster output device is selected from the group consisting of a laser printer, a color laser printer, an inkjet printer, and a color inkjet printer.

24. A raster output device comprising:

means for marking an output device pixel with an output value defined by a tile; and means for building the tile from a base value and a fractional tile.

25. The raster output device of claim 24 further comprising:

means for rendering a fractional tile for a sample value in response to a request from the marking means, where the fractional tile has a bit depth of one; and a cache for storing fractional tiles for use by the means for building a tile.

26. The raster output device of claim 24 further comprising:

memory storing a full set of fractional tiles for a range of possible pixel sample values for the output device pixel.

27. A computer program, residing on a computer-readable medium, comprising instructions for causing a raster output device to:

build a tile based on a fractional tile and a base value; and provide the tile to a marking routine in response to a request for a tile to halftone a sample value.

* * * * *